US008833059B2

(12) United States Patent
Keppeler

(10) Patent No.: US 8,833,059 B2
(45) Date of Patent: Sep. 16, 2014

(54) MOTOR-VEHICLE INTERNAL COMBUSTION ENGINE WITH EXHAUST-GAS RECIRCULATION

(75) Inventor: Berthold Keppeler, Owen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/883,387

(22) PCT Filed: Oct. 18, 2011

(86) PCT No.: PCT/EP2011/005244
§ 371 (c)(1),
(2), (4) Date: Jun. 27, 2013

(87) PCT Pub. No.: WO2012/059180
PCT Pub. Date: May 10, 2012

(65) Prior Publication Data
US 2013/0269327 A1 Oct. 17, 2013

(30) Foreign Application Priority Data
Nov. 4, 2010 (DE) .................... 10 2010 050 413

(51) Int. Cl.
F01N 3/00 (2006.01)
F01N 3/02 (2006.01)
F01N 3/10 (2006.01)
F01N 3/20 (2006.01)
F02M 25/07 (2006.01)
F02B 37/013 (2006.01)
F01N 3/08 (2006.01)
F02B 37/12 (2006.01)
F02B 37/18 (2006.01)
F02B 37/00 (2006.01)
F01N 13/02 (2010.01)
F01N 3/035 (2006.01)

(52) U.S. Cl.
CPC ........... F01N 3/08 (2013.01); F01N 2610/1453 (2013.01); F01N 13/02 (2013.01); F01N 3/2066 (2013.01); F02M 25/0718 (2013.01); Y02T 10/24 (2013.01); F02B 37/013 (2013.01); Y02T 10/144 (2013.01); F02M 25/0707 (2013.01); F02B 37/127 (2013.01); Y02T 10/121 (2013.01); F01N 3/035 (2013.01); F02B 37/18 (2013.01); F01N 2240/36 (2013.01); F01N 2610/02 (2013.01); F02M 25/0709 (2013.01); F01N 3/103 (2013.01); F02M 25/0711 (2013.01); F02B 37/004 (2013.01)
USPC ................... 60/287; 60/280; 60/288; 60/295; 60/299; 60/301; 60/297; 60/311

(58) Field of Classification Search
USPC ........... 60/287, 288, 280, 297, 295, 299, 301, 60/311
See application file for complete search history.

(56) References Cited

U.S. PATENT DOCUMENTS 7,650,746 B2 * 1/2010 Hu et al. .......................... 60/286
7,818,959 B2 * 10/2010 Hu et al. .......................... 60/274

(Continued)

FOREIGN PATENT DOCUMENTS

DE 10 2008 031 944 A1 4/2009
DE 10 2009 014 361 A1 9/2010

(Continued)

OTHER PUBLICATIONS

International Search Report with English translation dated Feb. 29, 2012 (four (4) pages).

(Continued)

Primary Examiner — Thomas Denion
Assistant Examiner — Dapinder Singh
(74) Attorney, Agent, or Firm — Crowell & Moring LLP

(57) ABSTRACT

A motor vehicle combustion engine includes an air supply section and an exhaust gas recirculation section that includes a particle filter and an SCR exhaust gas purification component. A first exhaust gas turbocharger includes a turbine arranged upstream of the particle filter in the exhaust gas section. A first exhaust gas recirculation line, which diverges from the exhaust gas section upstream of the turbine of the first exhaust gas turbocharger, and a second exhaust gas recirculation line, which diverges from the exhaust gas section downstream of the particle filter are provided to recirculate the exhaust gas from the exhaust gas section into the air supply system. An SCR catalyst is arranged in the second exhaust gas recirculation line.

13 Claims, 1 Drawing Sheet

(56) References Cited

U.S. PATENT DOCUMENTS

| | | | |
|---|---|---|---|
| 8,141,343 B2* | 3/2012 | Nagai et al. | 60/285 |
| 8,146,353 B2* | 4/2012 | Hagimoto et al. | 60/322 |
| 2001/0032458 A1* | 10/2001 | Suzuki et al. | 60/288 |
| 2002/0073694 A1* | 6/2002 | Minami | 60/288 |
| 2005/0011184 A1 | 1/2005 | Price et al. | |
| 2008/0155968 A1* | 7/2008 | Salemme et al. | 60/288 |
| 2009/0077968 A1 | 3/2009 | Sun | |
| 2009/0151333 A1* | 6/2009 | Vigild et al. | 60/286 |
| 2009/0178407 A1 | 7/2009 | Joergl et al. | |
| 2009/0217646 A1 | 9/2009 | Danby et al. | |
| 2009/0249782 A1* | 10/2009 | Li et al. | 60/599 |
| 2009/0271094 A1* | 10/2009 | Stablein et al. | 701/108 |
| 2010/0018187 A1 | 1/2010 | Matsumoto et al. | |
| 2010/0050631 A1* | 3/2010 | Yager | 60/604 |

FOREIGN PATENT DOCUMENTS

| WO | WO 2008/030314 A1 | 3/2008 |
|---|---|---|
| WO | WO 2008/103230 A1 | 8/2008 |
| WO | WO 2010/020265 A1 | 2/2010 |

OTHER PUBLICATIONS

Form PCT/ISA/237 dated Feb. 29, 2012 (six (6) pages).

* cited by examiner

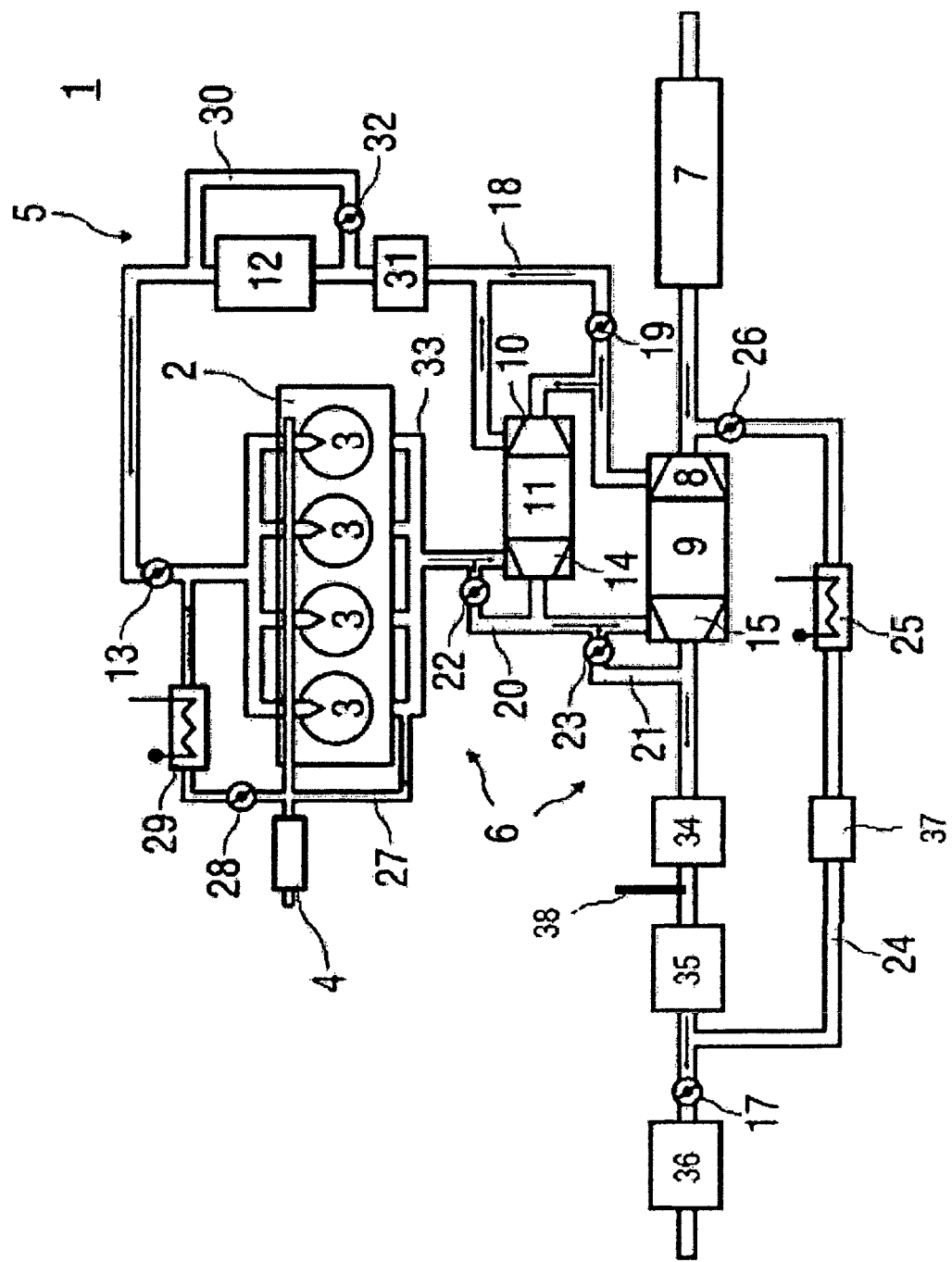

MOTOR-VEHICLE INTERNAL COMBUSTION ENGINE WITH EXHAUST-GAS RECIRCULATION

CROSS-REFERENCE TO RELATED APPLICATIONS

The present application is related to PCT International Application Number PCT/EP2011/005243, filed Oct. 18, 2011, a national stage application of which is U.S. patent application Ser. No. 13/883,387.

BACKGROUND AND SUMMARY OF THE INVENTION

The invention relates to a motor vehicle combustion engine with exhaust-gas recirculation.

PCT publication WO 2008/102230 A1 disclose a combustion engine with exhaust gas recirculation with a particle filter and an upstream SCR catalyst arranged in the exhaust gas section. Ammonia or urea can be conveyed upstream from the SCR catalyst into the exhaust gas section as a nitrogen oxide reduction means by means of an addition device. The exhaust gas recirculation thus takes place via a low-pressure path diverging from the exhaust gas section downstream of the particle filter.

Similar combustion engines described in PCT publication WO 2008/030314 A1, and in German publication DE 10 2009 014 361 A1, which additionally possess an exhaust gas recirculation via a high-pressure path. A further SCR catalyst, arranged downstream of the particle filter, is provided in PCT publication WO 2008/030314 A1.

When there is exhaust gas recirculation via a low-pressure path, it can, however, lead to pollution of an exhaust gas cooler arranged in the low-pressure path, due to, for example, nitrogen oxide or sulphur-based compounds contained in the recirculated exhaust gas.

Exemplary embodiments of the present invention provide a motor vehicle combustion engine that enables efficient exhaust gas purification with exhaust gas recirculation with as low a level of contamination as possible.

The motor vehicle combustion engine according to the invention has an air supply system for supplying combustion air to the combustion engine and an exhaust gas section containing exhaust gases of the combustion engine, in which a particle filter and an SCR exhaust gas purification component, which is able to carry out the selective catalytic nitrogen oxide reduction by means of ammonia, are arranged. Thus, for the combustion engine according to the invention, an addition device for adding ammonia or a reduction means capable of separating ammonia is provided upstream of the SCR exhaust gas purification component. Furthermore, a first exhaust gas turbocharger is provided, the turbine of which is arranged upstream of the particle filter in the exhaust gas section. A first exhaust gas recirculation, which diverges from the exhaust gas section upstream of the turbine of the first exhaust gas turbocharger, and a second exhaust gas recirculation, which diverges from the exhaust gas section downstream of the particle filter, are provided to recirculate the exhaust gas from the exhaust gas section into the air supply system. An SCR catalyst is arranged in the second exhaust gas recirculation line.

The first exhaust gas recirculation line, which diverges upstream from the exhaust gas turbocharger turbine, is a high-pressure exhaust gas recirculation path, via which a high-pressure proportion of recirculated exhaust gas can be fed from the exhaust gas section into the air supply system.

The second exhaust gas recirculation line, which diverges from the exhaust gas section downstream of the particle filter, represents a low-pressure exhaust gas recirculation path, via which a low-pressure proportion of recirculated exhaust gas can be fed into the air supply system.

It is possible to improve nitrogen oxide conversion by means of the SCR catalyst arranged in the second exhaust gas recirculation line. The SCR catalyst in the second exhaust gas recirculation line enables load relief of the SCR exhaust gas purification component in the exhaust gas section and reduces both the nitrogen oxide and ammonia content of the exhaust gas recirculated via the low-pressure path. Contamination, for example by ammonia or nitrogen oxide compound deposits in the second exhaust gas recirculation line, is thus avoided and the exhaust gas emission of the combustion engine is improved. As a consequence of the resulting nitrogen-oxide-low exhaust gas recirculation, the fuel combustion in the combustion engine is improved. The SCR catalyst in the second exhaust gas recirculation line also enables at least comparatively large particles to be absorbed, whereby a separate large particle filter can be omitted in the second exhaust gas recirculation line. In addition, the SCR catalyst produces standardized flow, whereby pressure losses via the second exhaust gas recirculation line are reduced. The SCR catalyst in the second exhaust gas recirculation line and the SCR exhaust gas purification component in the exhaust gas section thus comprise a catalytically effective material with respect to selective nitrogen oxide reduction under oxidizing conditions by means of ammonia. The SCR catalyst in the second exhaust gas recirculation line is preferably designed as a supported honeycomb body with an SCR catalyst material coating or as a fully-extruded honeycomb body, for example based on vanadium pentoxide/titanium oxide/tungsten oxide. The SCR catalyst material coating can also be applied to a particle filter structure that is suitable for filtering particles. It is particularly preferably to have a honeycomb body monolith with a zeolite coating containing copper or iron.

In accordance with one aspect of the present invention, the SCR exhaust gas purification component arranged in the exhaust gas section is designed as a catalytic coating of the particle filter and/or as a separate SCR catalyst component arranged upstream and/or downstream of the particle filter in the exhaust gas section. In an embodiment, this can be applied to the impure gas side or to the purified gas side of the filter-effective material as a catalytic coating of the particle filter. In the case of a particle filter designed as a wall-flow filter, the coating can be applied to the surface of individual or all gas inlet channels or to the surface of individual or all gas outlet channels. Thus, the coating can also be provided only in sections, preferably on an upstream sectional region of the particle filter. It is preferable for a separate SCR catalyst component to be provided in the exhaust gas section additionally or alternatively. This is preferably provided downstream of the particle filter, in particular downstream of the point of divergence of the second exhaust gas recirculation line in the exhaust gas section. However, provision can also be made for an arrangement to be directly on the inlet or outlet side of the particle filter. Provision is preferably made for the larger proportion of nitrogen oxide reduction to be carried out by the SCR exhaust gas purification component and for the smaller proportion to be carried out by the SCR catalyst arranged in the second exhaust gas recirculation line.

In a further embodiment of the invention, an oxidation catalyst in the exhaust gas section is arranged downstream of the turbine of the first exhaust gas turbocharger, and upstream of the particle filter. The oxidation catalyst enables oxidative displacement of excess hydrocarbons in the exhaust gas. Furthermore, nitrogen monoxide contained by the oxidation catalyst in the exhaust gas is at least partially oxidized into nitrogen dioxide, which can itself displace soot that is deposited in the particle filter at comparatively low temperatures (300° C. to 450° C.) by oxidation. Furthermore, an increased concentration of nitrogen dioxide enables an improved nitrogen oxide reduction process at the SCR exhaust gas purification component. For this, provision is preferably made to adjust a nitrogen dioxide proportion of nitrogen oxides contained in the exhaust gas to approximately 50% on the inlet side of the SCR exhaust gas purification component, by means of suitable adjustment of the relationship between the amount of exhaust gas that is recirculated via the low-pressure exhaust gas recirculation path and the high-pressure exhaust gas recirculation path. Moreover, by oxidizing the hydrocarbons that are additionally inserted into the exhaust gas, it is possible to raise the exhaust gas temperature, if necessary. In particular, for thermal regeneration of the particle filter by soot combustion, the exhaust gas can be enriched with hydrocarbons by after injection in the engine or by secondary fuel injection outside of the engine.

In a further embodiment of the invention, provision is made to add ammonia or the reduction means that is capable of separating ammonia downstream of the oxidation catalyst and upstream of the particle filter. Thus, on the one hand, ammonia oxidation is avoided, while on the other hand, hydrolysis of urea that is added as a reduction means, if necessary, is improved as a consequence of the flow path through the particle filter.

In a further embodiment of the invention, adjustment means for adjusting the recirculated amount of exhaust gas are provided, which comprise an adjustable restrictor element, arranged in the exhaust gas section downstream of the point of divergence of the second exhaust gas recirculation line and/or in the second exhaust gas recirculation line of the in-flow point into the air supply system thereof, and/or an adjustable restrictor element, arranged in the first exhaust gas recirculation line of the in-flow point into the air supply system thereof. It is thus also possible to adjust the relationship between the high-pressure exhaust gas recirculation rate and low-pressure exhaust gas recirculation rate over practically the entire operating region of the combustion engine, depending on need and the working point, just as a variable adjustment of the total amount of exhaust gas recirculation. If an SCR catalyst is provided in the exhaust gas section downstream of the point of divergence of the second exhaust gas recirculation line, the restrictor element is arranged in the exhaust gas section, preferably between the point of divergence and the SCR catalyst. An arrangement downstream of the SCR catalyst is also possible.

The adjustment means for adjusting the low-pressure proportion and/or the high-pressure proportion of the total amount of recirculated exhaust gas are thus also used, depending on the working point of the combustion engine, to adjust a proportion of nitrogen dioxide ($NO_2$), which is advantageous for the catalytic reduction of nitrogen oxide of the SCR exhaust gas purification component, of the nitrogen oxides that are present in the exhaust gas on the inlet side of the SCR exhaust gas purification component. Thus, an adjustment of the low-pressure proportion of recirculated exhaust gas is performed in such a way that a proportion of $NO_2$ results which is lower than 70%. It is particularly preferable to adjust the low-pressure proportion in such a way that the $NO_2$ proportion of $NO_2$ contained in the exhaust gas is approximately 50%.

In a further embodiment of the invention, a second exhaust gas turbocharger is provided, the turbine of which is arranged downstream of the turbine of the first exhaust gas turbocharger in the exhaust gas section. This enables two-tiered charging of the combustion engine with a corresponding increase in efficiency with a comparatively reduced pollutant discharge.

In a further embodiment of the invention, a circumventable charge air cooler is arranged in the air supply system to cool compressed combustion air. This enables a variable decrease in the combustion temperature of combusted fuel in the combustion chambers of the combustion engine and thus a further decrease in the pollutant emission of the combustion engine, in particular with respect to nitrogen oxide.

In a further embodiment of the invention, an exhaust gas cooler is arranged in the first exhaust gas recirculation line and/or the second exhaust gas recirculation line in order to cool the exhaust gas that is recirculated to the air supply system. This also enables a decrease in the combustion temperatures. It is thus also advantageous if a bypass line is provided in a further embodiment of the invention for the exhaust gas cooler arranged in the first exhaust gas recirculation line and/or in the second exhaust gas recirculation line.

Further advantages, features and details of the invention arise from the description of preferred exemplary embodiments below, as well as with the aid of the FIGURE. The features and feature combinations cited in the description above and the features and feature combinations cited below in the description of the figures and/or shown in the FIGURE alone cannot solely be used in each specified combination, but rather also in other combinations or individually, without exceeding the scope of the invention.

BRIEF DESCRIPTION OF THE DRAWING FIGURE

The sole FIGURE is a schematic depiction of a preferred embodiment of an air-compressing combustion engine 1 according to the invention, having two-tiered exhaust gas recirculation and presently with two-tiered charging.

DETAILED DESCRIPTION

The combustion engine 1 comprises an engine block 2 with working cylinders 3 with combustion chambers that are not illustrated in greater detail, wherein fuel can be supplied to the working cylinders 3 or the respective combustion chamber thereof by means of a high-pressure pump 4. An air supply system 5 supplies the working cylinders 3 or the respective combustion chamber thereof and an exhaust gas section 6 conducts exhaust gas from the working cylinders 3. The air supply system 5 include an air filter 7, a first compressor 10 of a first exhaust gas turbocharger designed as a high-pressure exhaust gas turbocharger 11, a second compressor 8 of a second exhaust gas turbocharger designed as a low-pressure exhaust gas turbocharger 9, a charge air cooler 12 and a throttle valve 13.

The exhaust gas section 6 includes a first turbine 14, which is allocated to the high-pressure exhaust gas turbocharger 11, based on the engine block 2 in the flow direction of the exhaust gas, a second turbine 15, which is allocated to the low-pressure exhaust gas turbocharger 9, an oxidation catalyst 34, a particle filter 35, an exhaust gas retention flap 17 and an SCR catalyst component 36. The oxidation catalyst 34 can also be dispensed with.

The particle filter 35 can be designed as sintered metal or as a permeable filtering unit constructed with a honeycomb body. It is preferable to provide a catalytic coating for the particle filter 35. Particularly when the oxidation catalyst 34 is dispensed with, the catalytic coating of the particle filter 35 comprises an efficient material for catalytic oxidation.

In a particularly preferred embodiment, an SCR exhaust gas purification component is allocated to the particle filter 35. This can be arranged as a separate component directly in front of or behind the particle filter 35 in the exhaust gas section 6, or integrated into the particle filter 35, which is not depicted separately here. In this case, the SCR catalyst component 36 can also be dispensed with. If, as is depicted, an oxidation catalyst 34 is arranged upstream of the particle filter 35, it is preferred for the SCR exhaust gas purification component allocated to the particle filter 35 to be designed as a catalytic coating of the particle filter 35. This coating can be applied to the gas inlet side or the gas outlet side of the corresponding filter-effective material. In the preferred embodiment of the particle filter 35, the coating with the corresponding SCR catalyst material is preferably provided on the channel walls that are exposed to the impure gas as a conventional permeable filter with a honeycomb body. In this case it can be advantageous to only provide the SCR exhaust gas purification components in sections as the coating. For example, a coating with a SCR catalyst material can be provided by a first part of the axial dimensions of the particle filter 35 of approximately 50% of the length. For this, a rear part, as seen in the axial direction, preferably has an efficient coating for catalytic oxidation added to it.

To supply the SCR exhaust gas purification component arranged in the exhaust gas section 6, be it in the embodiment of a coating of the particle filter 35 or as a separate catalyst component 36, provision is made for a supply for a reduction means, which stimulates selective nitrogen oxide reduction, to the exhaust gas. For this, an addition device 38 is provided upstream of the SCR exhaust gas purification component, in particular upstream of the particle filter 35, for ammonia or for a reduction means capable of separating ammonia. It is particularly preferable to have an addition device 38 that can inject a urea-water solution into the exhaust gas section 6. Thus, to improve equal distribution, a downstream agitator that is not separately depicted can be arranged in the exhaust gas section 6. If, as is depicted, an oxidation catalyst 34 is connected upstream of the particle filter, the addition device 38 is preferably arranged between the oxidation catalyst 34 and the particle filter 35.

One or more further exhaust gas post-treatment components that are effective for purification, such as a further oxidation catalyst, an SCR catalyst and/or a nitrogen oxide storage catalyst can be arranged in the exhaust gas section 6 upstream of the particle filter 35 or the oxidation catalyst 34 and/or downstream of the particle filter 35 or of the SCR catalyst component 36. For example, it is advantageous to provide a so-called ammonia trap downstream of the SCR catalyst component 36 in the exhaust gas section 6. The cited exhaust gas purification components are known to the person skilled in the art, which is why they are not described in greater detail here. It is understood below, without limiting the applicability of the invention, that the exhaust has purification components arranged in the exhaust gas section 6, as seen in the exhaust gas flow direction, comprise an oxidation catalyst 34, a particle filter 35 having a coating with an SCR catalyst material and a downstream SCR catalyst component 36 designed as an SCR catalyst in this order.

Regarding the charging of the combustion engine 1, a compressor bypass 18, which bypasses the high-pressure exhaust gas turbocharger 11, diverges downstream of the second compressor 8, in which a compressor bypass valve 19 is arranged. Thus, by means of the second compressor 8, compressed fresh air or a fresh air-exhaust gas mixture can filter the first compressor 10 to a relatively large extent, depending on an operating status of the combustion engine 1 and a position of the compressor bypass valve 19 resulting therefrom. In this way, a charging pressure of the combustion engine 1 is adjustable or when the rotational speed of the combustion engine 1 is low (where the high-pressure exhaust gas turbocharger 11 still cannot be operated due to the exhaust gas pressure being too low) the first compressor 10 can be circumvented by the compressor bypass 18.

Bypasses 20, 21 are also arranged in the exhaust gas section 6, which each bypass a turbine 14, 15, namely a first turbine bypass 20, in which a first turbine bypass valve 22 is arranged, and a second turbine bypass 21, in which a second turbine bypass valve 23 is arranged. When the rotational speed of the combustion engine 1 is low and, as a consequence of this, there is low exhaust gas pressure, the high-pressure exhaust gas turbocharger 11 still cannot be operated, so the first turbine bypass valve 22 can be activated in this operating status in such a way that an exhaust gas mass flow can be fed via the first turbine bypass 20 around the first turbine 14 and thus can be used completely to drive the second turbine 15 of the low-pressure exhaust gas turbocharger 9.

When the rotational speed of the combustion engine 1 is very high, the exhaust gas pressure acting on the turbines 14, 15 of the exhaust gas turbocharger 9, 11 is high, which achieves a high rotational speed. From this, there is a high level of compressor efficiency for the compressors 8, 10 of the exhaust gas turbocharger 9, 11, and thus a high charging pressure of the fresh air-exhaust gas mixture. However, this may not exceed a predetermined value, such that, when this predetermined value is achieved, one or both turbine bypasses 20, 21 can be used as so-called "wastegates". For this, the turbine bypass valves 22, 23 can be activated in such a way that, for example, they open partially, so that part of the exhaust gas mass flow can be fed around the turbines 14, 15 and thus the exhaust gas pressure that acts on and drives the turbines 14, 15 can be reduced. From this, low compression of the gas compressed by the compressors 8, 10 of the exhaust gas turbochargers 9, 11 results, i.e. a lower charging pressure.

The efficiency of the combustion engine 1 can be optimized in various rotational speed fields by means of this arrangement of the low-pressure exhaust gas turbocharger 9 and the high-pressure exhaust gas turbocharger 11 and a respectively optimal charging pressure can be provided. Thus, a so-called "turbo-lag", i.e. non-existent or low charging pressure and low efficiency of such a combustion engine 1 arising therefrom in areas of low rotational speed can be prevented or this probably can at least be considerably be reduced and thus, for example, handling performance and fuel consumption of the vehicle driven by this combustion engine 1 can be optimized.

For the combustion engine 1 according to the invention, a two-tiered exhaust gas recirculation (EGR) is provided in the form of a low-pressure exhaust gas recirculation and a high-pressure exhaust gas recirculation.

To implement the low-pressure exhaust gas recirculation, a low-pressure exhaust gas recirculation (EGR) line 24 is provided, which diverges downstream of the particle filter 35 and before the SCR catalyst component 36, i.e., on a low-pressure side of the exhaust gas section 6. The low-pressure EGR line 24 flows into the air supply system 5 upstream of the second compressor 8 of the low-pressure exhaust gas turbocharger 9 and downstream of the air filter 7. A low-pressure EGR cooler 25 and a low-pressure EGR valve 26 are arranged in the low-pressure EGR line 24 downstream of the divergence from the exhaust gas section 6, as seen in the flow direction of a low-pressure EGR mass flow. Optionally, the cooling of the low-pressure EGR mass flow can take place when the low-pressure EGR cooler 25 is dispensed with via the pipe lengths or pipe forms used. Cooling the low-pressure EGR mass flow ensures that when the exhaust gas recirculation is operating inadmissibly high temperatures do not occur at the compressors 8, 10. In the embodiment depicted according to the invention, an SCR catalyst 37 is also provided in the low-pressure EGR line 24 upstream of the low-pressure EGR cooler 25. The second SCR catalyst 37 enables a reduction in the amount of nitrogen oxide and/or ammonia or oxygen present in the recirculated exhaust gas, if necessary. Thus, in turn, deposits, in particular on the cooling surfaces of the low-pressure EGR cooler 25, and occurrences of corrosion are generally avoided or reduced and an improved process for the fuel combustion taking place in the combustion chambers of the combustion engine 1 is enabled. The SCR catalyst 37 can be designed in such a way that it can undertake a filtering function, such that at least comparatively large particles can be removed from the exhaust gas that is recirculated via the low-pressure path.

A high-pressure EGR line 27 is provided to carry out the high-pressure exhaust gas recirculation, with the line diverging from an exhaust manifold 33 of the exhaust gas section 6 upstream of the turbine 14 of the high-pressure exhaust gas turbocharger 11, i.e. on a high-pressure side of the exhaust gas section 6. The high-pressure EGR line 27 flows into the air supply system 5 downstream of the throttle valve 13. A high-pressure EGR mass flow can be fed into the air supply system 5 via a high-pressure EGR valve 28 by means of this high-pressure EGR line 27. In the embodiment depicted, a high-pressure EGR cooler 29 is arranged in the high-pressure EGR line 27, which, if necessary, can be combined with the low-pressure EGR cooler 25 structurally or functionally. Optionally, however, cooling the high-pressure EGR mass flow can also take place via a tube length of the high-pressure EGR line 27, for example. Bypass lines, in particular with adjusting means for variable flow rate adjustment, can be provided for the low-pressure EGR cooler 25 and/or the high-pressure EGR cooler 29, with this not being separately depicted.

The illustrated combustion engine 1 thus has an exhaust gas recirculation, wherein exhaust gas can be removed from the exhaust gas section 6 upstream of the turbine 14 of the high-pressure exhaust gas turbocharger 11 via a corresponding high-pressure path, and downstream of the particle filter 35 via a corresponding low-pressure path and, if necessary after cooling, can be fed upstream of the compressor 8 of the low-pressure exhaust gas turbocharger 9 and downstream of the throttle valve 13 of the air supply system 5 and thus to the combustion chambers 3 of the combustion engine 1. Here, the combustion engine 1 can be operated, according to choice, without exhaust recirculation, with high-pressure exhaust gas recirculation, low-pressure exhaust gas recirculation, or simultaneously with high-pressure exhaust gas recirculation and low-pressure exhaust gas recirculation with correspondingly variable amounts of exhaust gas recirculation. Thus, in the combustion chambers 3 of the combustion engine 1, a combustion gas with an exhaust gas recirculation rate that can be altered to a large extent, can be fed with a variable low-pressure proportion and a variable high-pressure proportion. The adjustment of an amount of exhaust gas recirculation, i.e. of the recirculated exhaust gas mass flow and thus the EGR rate, is carried out by means of the exhaust gas retention flap 17 and/or the low-pressure EGR valve 26 and by means of the high-pressure EGR valve 28 as adjusting means, with which the low-pressure proportion and high-pressure proportion of the entire amount of recirculated exhaust gas can also be adjusted to a large extent. On the whole, this produces clean exhaust gas recirculation mass flows, improved cooling of the exhaust gas recirculation mass flows, reduces sooting of the exhaust gas recirculation coolers 25, 29 and enables good mixing of the exhaust gas recirculation mass flows with fresh air in the air supply system 5. High exhaust gas recirculation rates are possible and it is also possible to have a homogeneous or at least partly homogeneous operation of the combustion engine 1.

The exhaust gas retention flap 17 and the low-pressure EGR valve 26 are regulator elements of an exhaust gas recirculation regulator that is embodied as an initial control regulator. Both the low-pressure EGR valve 26 and the exhaust gas retention flap are preferably continuously displaceable. With the aid of the exhaust gas retention flap 17 and the low-pressure EGR valve 26 before the compressor 8, the low-pressure proportion of the entire exhaust gas recirculation mass flow can be adjusted and the latter can thus also be influenced. As long as there a sufficient drop in pressure to convey the low-pressure exhaust gas recirculation mass flow, this can first be adjusted exclusively via the low-pressure EGR valve 26. If this is no longer the case, the exhaust gas retention flap 17 is also somewhat adjustable, so as to increase the drop in pressure via the low-pressure EGR valve 26. This ensures very good mixing of the low-pressure exhaust gas recirculation mass flow with fresh air. Among other things, there is a further advantage in that the exhaust gas that is recirculated via the low-pressure path is clean and virtually pulsation-free. In addition, there is increased compressor efficiency, since, when there is a high low-pressure proportion of recirculated exhaust gas, a comparatively high exhaust gas mass flow can be fed through the turbines 14, 15. Since the recirculated exhaust gas can be fed through the efficient charge air cooler 12 after the compressors 8, 10, the temperature of the combustion gas containing the fresh air and exhaust gas can also be kept relatively cool. According to need, the combustion chamber 1 can be operated both with high-pressure exhaust gas recirculation and with low-pressure exhaust gas recirculation, or with both.

Sooting of the charge air cooler 12 can be avoided by means of a charge air bypass 30 in the air supply system 5 that is preferably provided to bypass the charge air cooler 12. The danger of this so-called sooting occurs, for example, when a gas mixture containing steam and sometimes particles is cooled in the charge air cooler 12 below the dew-point and there is a build-up of condensation.

Provision is preferably made for the entire fresh air-exhaust gas mixture, or even only a part thereof, to be able to be fed past the charge air cooler 12 via the charge air cooler bypass 30, which diverges upstream of the charge air cooler 12, whereby it cannot be cooled by the charge air cooler 12 and thus the temperature does not drop below the dew-point. In order to ensure that the fresh air-exhaust gas mixture can still be cooled effectively by means of the charge air cooler 12, if necessary, i.e. when the fresh air-exhaust gas mixture is at high temperatures, a temperature sensor 31 is arranged downstream of the compressors 8, 10 and upstream of the charge air cooler 12 in the air supply system 5, such that, when a predetermined temperature is reached, a charge air cooler bypass valve 32 arranged in the charge air cooler bypass 30 can be activated accordingly and this charge air cooler bypass valve 32 hereupon opens completely or closes completely, for example, or, in a further embodiment, opens partially.

Further sensors are preferably provided in the exhaust gas section 6 and in the air supply system 5 for optimal operation of the combustion engine 1, with this not being depicted in greater detail for purposes of clarity. In particular, temperature and/or pressure sensors can be arranged on the outlet side of the exhaust manifold 33, in the turbine bypasses 20, 21, on the inlet and outlet side or within the exhaust gas recirculation unit 16, on the inlet and outlet side of the air filter 7, on the inlet and outlet side of the compressors 8, 10, in the exhaust gas recirculation lines 24, 27 and, if necessary, at additional points, in order to detect the temperature and pressure ratios. It is preferable for a further air mass flow sensor to be provided downstream of the air filter 7 for the detection of the fresh air mass flow.

Furthermore, it is preferable to provide exhaust gas sensors in the exhaust gas section 6, such as a lambda sensor in the exhaust manifold 33 and before and/or after the particle filter 35. It is also preferable for one or more nitrogen oxide sensors, which are not depicted separately, to be provided, in particular directly behind the oxidation catalyst 34 and/or behind the SCR catalyst component 36. The signals of the present sensors can be processed by a control and regulation device that is not depicted here, which can detect operating status of the combustion engine 1 on the whole, in particular in the exhaust gas section 6 and in the air supply system 5, with the aid of the signals and stored characteristic lines and maps, and can adjust these by activating regulator elements in a controlled and/or regulated manner. In particular, exhaust gas recirculation mass flows in the low and high-pressure path, as well as a charge state of the combustion engine 1 with respect to torque and mean pressure, as well as rotational speed, can be detected or adjusted.

A pollutant-low and economical operation of the combustion engine 1 with high power density is enabled by the embodiment according to the invention. In particular, due to the influence of a low-pressure exhaust gas recirculation proportion and a high-pressure exhaust gas recirculation proportion, a temporally stable purification method based on nitrogen oxide is possible over extensively long operating times. Here, the SCR catalyst 37 plays a definitive role in the low-pressure EGR line 24. The SCR catalyst 37 provided according to the invention enables at least an extensive reduction of the nitrogen oxide and ammonia proportion in the exhaust gas that is recirculated by the low-pressure EGR line 24. This enables a comparatively high dosing rate, which is at least temporarily hyperstoichiometric with respect to nitrogen oxide, to be adjusted by a reduction means that is added to the exhaust gas by the addition device 38. The efficiency of SCR exhaust gas purification components provided in the exhaust gas section 6 is thus improved. Nitrogen oxide and ammonia surging through the particle filter are, as long as they are not extracted from the exhaust gas section 6 via the low-pressure EGR line 24, broken down by the following SCR catalyst component 36. Residual nitrogen oxide and ammonia that are not extracted via the low-pressure EGR line 24 are, however, broken down in the SCR catalyst and thus corrosion caused by these components is avoided in the low-pressure exhaust gas recirculation path. The combustion engine 1 thus receives an exhaust gas that is at least almost completely pure of nitrogen and ammonia, at least via the low-pressure EGR line 24. As a consequence of the arrangement of the SCR catalyst 37, this is maintained free of deposits upstream of the low-pressure EGR cooler 25, with these deposits being formed from nitrogen oxides or ammonia/urea ingredients that are contained in the exhaust gas, and which are able to reduce heat exchange efficiency. An ammonium nitrate deposit in the entire low-pressure path, which is otherwise to be observed often and which is highly disadvantageous, is especially avoided, in particular in the low-pressure EGR cooler 25. Since the combustion engine 1 receives exhaust gas that is at least almost completely free of nitrogen oxide, at least via the low-pressure path, uncontrolled ignitions in the combustion chamber 13 caused by nitrogen oxides are avoided and the combustion is more stable on the whole. Particularly in the case of an SCR catalyst 37 that contains earth metals, oxidation of uncombusted fuel ingredients (HC, CO) is also enabled in the low-pressure exhaust gas recirculation path. This also has a counter-effect on sooting and lacquering of the low-pressure EGR cooler 25. Furthermore, the SCR catalyst 37 provokes a standardized flow in the low-pressure EGR line 24, pulsations are prevented or at least reduced and drops in pressure are diminished. Furthermore, a (large) filter that would otherwise be provided in the low-pressure EGR line 24 can be dispensed with, in particular if the SCR catalyst 37 possesses a filter function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle combustion engine, comprising:
   an air supply system configured to supply combustion air to the combustion engine;
   an exhaust gas section configured to receive an exhaust gas of the combustion engine, wherein the exhaust gas section includes a particle filter and an SCR exhaust gas purification component, which is capable of selective catalytic nitrogen oxide reduction by means of ammonia;
   an addition device configured to add ammonia or a reduction means configured to separate ammonia to the exhaust gas section upstream of the SCR exhaust gas purification component;
   an first exhaust gas turbocharger that includes a turbine arranged upstream of the particle filter in the exhaust gas section; and
   wherein in order to recirculate the exhaust gas from the exhaust gas section into the air supply system, the motor vehicle combustion engine further comprises
      a first exhaust gas recirculation line, which diverges from the exhaust gas section upstream of the turbine of the first exhaust gas turbocharger; and
      a second exhaust gas recirculation line, which diverges from the exhaust gas section downstream of the particle filter, wherein the second exhaust gas recirculation line include an SCR catalyst.

2. The motor vehicle combustion engine according to claim 1, wherein the SCR exhaust gas purification component is a catalytic coating of the particle filter or a separate SCR catalyst component arranged upstream or downstream of the particle filter in the exhaust gas section.

3. The motor vehicle combustion engine according to claim 1, further comprising:
   an oxidation catalyst in the exhaust gas section arranged downstream of the turbine of the first exhaust gas turbocharger, and upstream of the particle filter.

4. The motor vehicle combustion engine according to claim 3, wherein the motor vehicle combustion engine is configured so that ammonia can be added or the reduction means is capable of separating ammonia to the exhaust gas section downstream of the oxidation catalyst and upstream of the particle filter.

5. The motor vehicle combustion engine according to claim 3, further comprising:
   a further oxidation catalyst arranged in the exhaust gas section upstream of the oxidation catalyst or downstream of the particle filter.

6. The motor vehicle combustion engine according to claim 1, further comprising:
adjustment means configured to adjust a recirculated amount of exhaust gas, the adjustment means comprises
an adjustable restrictor element arranged in the exhaust gas section downstream of a point of divergence of the second exhaust gas recirculation line or in the second exhaust gas recirculation line of an in-flow point into the air supply system thereof, or
an adjustable restrictor element, arranged in the first exhaust gas recirculation line of the in-flow point into the air supply system thereof.

7. The motor vehicle combustion engine according to claim 1, further comprising:
a second exhaust gas turbocharger, which includes a turbine arranged downstream of the turbine of the first exhaust gas turbocharger in the exhaust gas section.

8. The motor vehicle combustion engine according to claim 1, further comprising:
a circumventable charge air cooler arranged in the air supply system, which is configured to cool compressed combustion air.

9. The motor vehicle combustion engine according to claim 1, further comprising:
an exhaust gas cooler arranged in the first exhaust gas recirculation line or the second exhaust gas recirculation line, which is configured to cool exhaust gas recirculated to the air supply system.

10. The motor vehicle combustion engine according to claim 9, further comprising:
a bypass line provided for the exhaust gas cooler arranged in the first exhaust gas recirculation line or in the second exhaust gas recirculation line.

11. The motor vehicle combustion engine according to claim 1, wherein the SCR catalyst arranged in the second exhaust gas recirculation line is a supported honeycomb body with an SCR catalyst material coating.

12. The motor vehicle combustion engine according to claim 11, wherein the SCR catalyst material coating is applied to a particle filter structure that is configured to filter particles.

13. The motor vehicle combustion engine according to claim 1, further comprising:
a nitrogen oxide storage catalyst arranged in the exhaust gas section upstream or downstream of the particle filter.

\* \* \* \* \*